United States Patent [19]

Van Rosmalen

[11] Patent Number: 4,882,723
[45] Date of Patent: Nov. 21, 1989

[54] DEVICE FOR OPTICALLY SCANNING A ROTATING DISC

[75] Inventor: Gerard E. Van Rosmalen, Eindhoven, Netherlands

[73] Assignee: U.S. Philips Corporation, New York, N.Y.

[21] Appl. No.: 209,454

[22] Filed: Jun. 15, 1988

[30] Foreign Application Priority Data

Jun. 30, 1987 [NL] Netherlands ............ 8701526

[51] Int. Cl.⁴ .................. G11B 3/10; G11B 3/32; G02B 7/04
[52] U.S. Cl. ........................ 369/256; 350/247; 350/255; 369/45
[58] Field of Search .......... 369/45, 244, 247, 256; 350/247, 255

[56] References Cited

U.S. PATENT DOCUMENTS

| | | | |
|---|---|---|---|
| 4,511,212 | 4/1985 | Tanaka | 350/255 |
| 4,557,564 | 12/1985 | van Rasmalen | 369/45 |
| 4,616,355 | 12/1986 | Kasahara | 369/45 |
| 4,660,190 | 4/1987 | Fujii et al. | 369/45 |
| 4,669,823 | 6/1987 | Iguma et al. | 369/45 |
| 4,679,185 | 7/1987 | van Sluys | 369/255 |
| 4,680,743 | 7/1987 | Araki | 369/44 |
| 4,702,555 | 10/1987 | Iguma et al. | 369/45 |
| 4,773,055 | 9/1988 | Gijzen et al. | 369/45 |

*Primary Examiner*—Steven L. Stephan

[57] ABSTRACT

The invention relates to a device for directing a radiation beam towards a recording surface of a rotating disc for recording and/or scanning a recording track without mechanical contact. The device comprises a frame (101), an objective holder (103) having an objective (19) with an optical axis (17), two elongate leaf springs (113, 115) which are arranged one above the other for movably supporting the objective holder relative to the frame, and an electromagnetic actuator (121A; 121B1, 121B2) for the controlled movement of the objective. One (113) of the leaf springs is elastically extensible in its longitudinal direction (113B) to allow pivotal movements of the objective about a pivotal axis 125 which extends transversely of a plane containing the optical axis and intersecting the leaf springs. (FIG. 5)

10 Claims, 3 Drawing Sheets

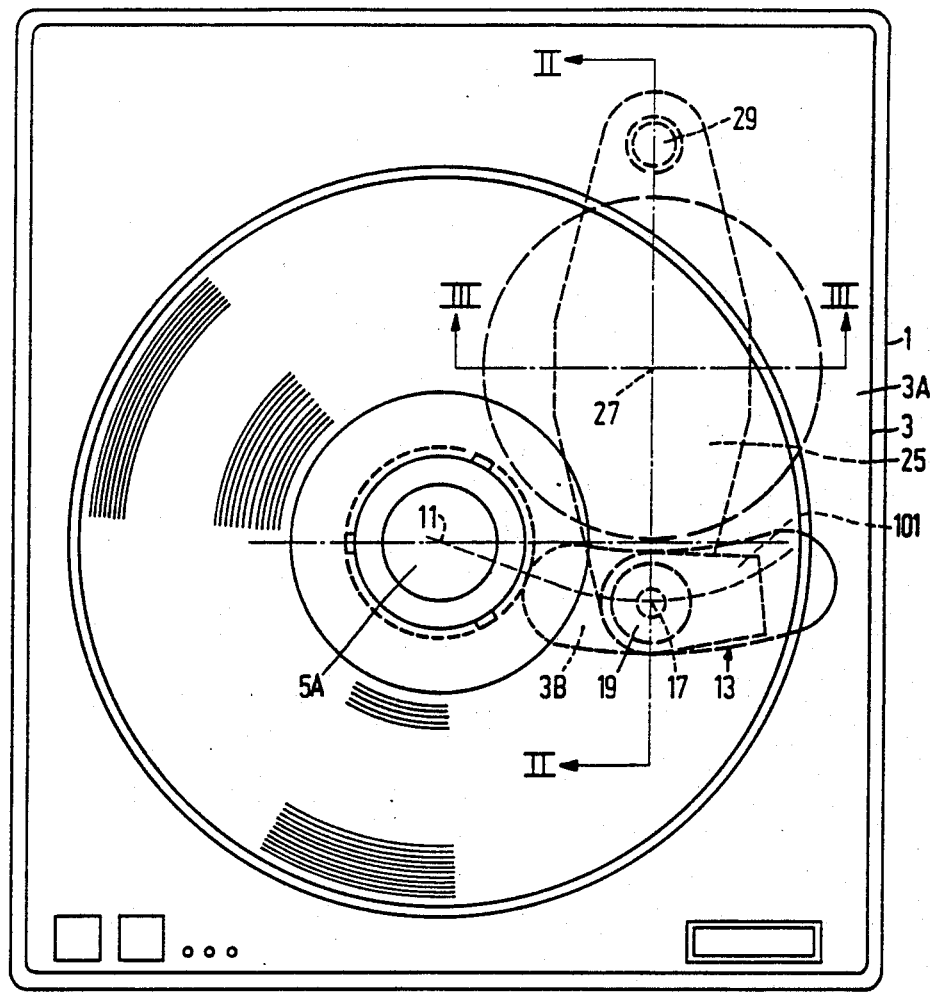
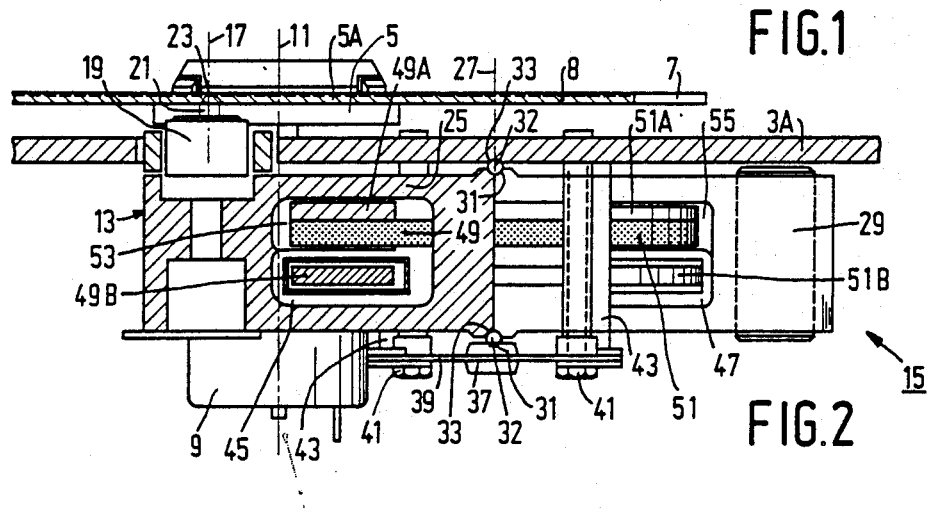
FIG.1
FIG.2

4,882,723

DEVICE FOR OPTICALLY SCANNING A ROTATING DISC

BACKGROUND OF THE INVENTION

The invention relates to a device for directing a radiation beam towards a recording surface of a rotating disc for recording and/or scanning a recording track without mechanical contact. Two elongnate leaf springs are arranged one above the other viewed along the optical axis of the objective and have their ends secured to the frame and to the objective holder to allow movements of the objective along the optical axis. First actuator means secured to the objective holder and second actuator means secured to the frame cooperate electromagnetically with one another via an air gap for the controlled movement of the objective.

Such a device is known from U.S. Pat. No. 4,557,564, hereby incorporated by reference. The known device has a frame constructed as a pivotal arm and is intended for use in an optical-disc player. The pivotal arm forms part of a pivotal-arm device and is capable of performing limited pivotal movements about a pivotal axis which extends parallel to the optical axis of the objective. The objective holder is supported by the leaf springs to allow upward and downward movements along the optical axis of the objective, so as to enable the radiation beam to be maintained constantly in focus on the recording surface of the optical disc. In order to enable the recording track on the disc to be followed by the objective in radial directions relative to the axis of rotation of the optical disc, said pivotal arm is driven and the pivotal movements of the pivotal arm are transmitted to the objective by the leaf springs.

The known device comprises opto-electronic means for automatically following the recording track of the rotating disc during operation. The frame, i.e. the pivotal arm, must then be pivoted bodily to enable the recording track to be followed. This presents no problem for low-frequency tracking movements, but the objective must also be capable of rapidly performing small radial displacements with a high frequency to enable local deviations in the position of the recording track to be followed. In this last-mentioned respect it is to be noted that on account of the size of the arm and the rather unfavourable radial transmission of the leaf springs the servo-bandwidth attainable with the known device is too limited to follow the recording track with a very high accuracy.

A known solution to the problem is use of a slide for coarsely following the recording track and an actuator arranged on the slide for more accurately following the track. However, this solution cannot readily be used in all known automatic tracking systems.

SUMMARY OF THE INVENTION

At least one of the leaf springs is elastically extensible in its longitudinal direction to allow pivotal movements of the objective about a pivotal axis which is oriented transversely of a plane containing the optical axis and intersecting the leaf springs, and the actuator is adapted to provide the driving force for said pivotal movements.

The device in accordance with the invention is suitable for use in optical disc players of different types. One of the types intended here is described, for example, in European Patent Application 0,176,127, which U.S. application Ser. No. 053,602 corresponds, and comprises a rectilinearly movable slide for moving the objective in a radial direction relative to the optical disc to be inscribed or read. In such a player the frame of the device in accordance with the invention can be secured to the slide, or may form part of the slide.

Another type of optical disc player for which the device in accordance with the invention is very suitable, is described, for example in U.S. Pat. No. 4,679,185, hereby incorporated by reference and comprises a pivotal-arm device for moving the objective between the inner and the outer track of the disc to be scanned. For this purpose the pivotal-arm device comprises a pivotal arm which can perform a limited pivotal movement about a pivotal axis which extends parallel to the axis of rotation of a turntable for the optical disc, in order to move and position the objective relative to the optical disc. In such a disc player the frame of the device in accordance with the invention can be secured to the pivotal arm or may be integral with said arm.

In disc players of the above types the known radial tracking devices are included in a one singlestage servo system to enable radial excursions of the recording track which recur every revolution to be followed constantly. The entire slide or pivotal arm is included in a servo loop to follow the recording track. If very stringent requirements are imposed on the dynamic bandwidth of the known tracking devices, these requirements cannot be met.

If optical disc players are provided with the device in accordance with the invention, this means in fact that the servo system is extended with a second stage in the form of a possibility of pivoting the objective relative to the frame of the device. The relevant pivotal movement to be performed by the objective need only be small and serves for rapidly following the recording track. A large bandwidth is attainable by a suitable choice of the actuator.

In leaf springs which can be manufactured simply, the elastically extensible leaf spring maybe rendered axially more compliant in a central area intermediate its two ends by openings which extend substantially transversely of the longitudinal direction of the leaf spring.

The elastically extensible leaf spring maybe rendered axially more compliant in a central area intermediate its two ends by at least one fold which extends substantially transversely of the longitudinal direction of the leaf spring. This embodiment allows a comparatively large extension of the elastically extensible leaf spring.

As an alternative it is possible in specific cases to provide the elastically extensible leaf spring with a portion made of rubber or a plastics.

Where the first actuator means includes an axially magnetized cylindrical magnet body, the second actuator means may include at least two banana-shaped segmental coils which are arranged adjacent one another viewed in the circumferential direction of the magnet body. These coils each comprise an active coil portion which adjoins the air gap and which extends circumferentially of the magnet body and a coil portion which is more remote from the air gap. Obviously, such segmental coils are disposed at opposite sides of the pivotal axis of the objective, so that in the case of a selective drive of the segmental coils a desired pivotal movement of the objective can be obtained for the purpose of rapid tracking. Experiments have shown that with this embodiment it is advantageous to arrange the elastically extensible leaf spring closer to the objective than the other leaf spring. If the objective comprises only one objective lens the elastically extensible leaf spring is preferably disposed in or at least substantially in the same plane as the objective lens. This arrangement of the leaf springs ensures that in the case of a selective drive of the segmental coils and a small pivoting angle the objective performs a substantially rectilinear movement, which is very desirable to preclude coma.

Where the first actuator means includes an axially magnetized cylindrical magnet body, the second actuator means may include at least two segmental coils arranged adjacent each other circumferentially of the magnet body, each segmental coil including two active coil portions adjoining the air gap and extending circumferentially of the magnet body. An advantage of this embodiment is that a high efficiency is attainable both in respect of tracking and focussing. An additional advantage is obtained if the mass center of the holder with the objective and the first actuator means is disposed at least substantially in the same plane as one of the leaf springs, the other leaf spring being the elastically extensible leaf spring, so that the position of the objective is not modified as a result of displacements of the frame of the device itself.

The invention further relates to an optical disc-player comprising a turntable having a supporting surface for the rotaty drive of an optical disc, and further comprising a device in accordance with the invention, the frame of the device being movable parallel to the supporting surface of the turntable.

BRIEF DESCRIPTION OF THE DRAWING

FIG. 1 is a plan view of an optical disc player in accordance with the invention, comprising a pivotal-arm device, FIG. 2 is a sectional view of a part of the optical disc player taken on the lines II—II in FIG. 1, a part of the pivotal arm being shown in side view.

DETAILED DESCRIPTION OF THE PREFERRED EMBODIMENT

Figure 3:
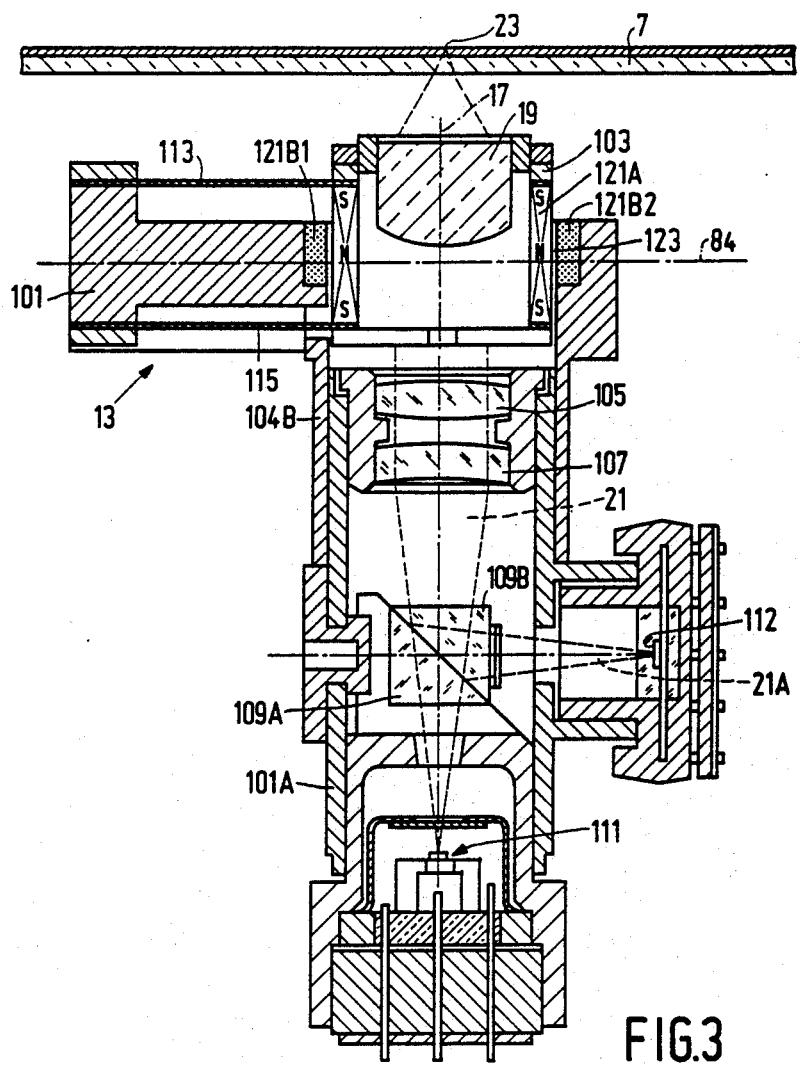
FIG. 3 is an enlarged-scale sectional view taken on the lines III—III in FIG. 1, showing the device in accordance with the invention used in the player shown in FIG. 1, for directing a radiation beam towards a rotating optical disc.

FIGS. 1 and 2 show an optical disc player in accordance with the invention, specifically a Compact Disc player, which comprises a housing 1 and a stationary chassis 3. The chassis 3 carries a turntable 5 having a supporting surface 5A for a Compact Disc 7 having a recording surface 8. The turntable 5 can be driven by an electric motor 9 and can thus be rotated together with the optical disc 7 about an axis of rotation 11. The optical disc 7 can be read in reflection by means of a device 13 in accordance with the invention, which forms part of a pivotal arm device 15. The device 13 comprises an objective 19 which is movable along an optical axis 17 to concentrate a laser beam 21 so as to form a read spot 23 on the recording surface 8. How the objective 19 is supported and driven will be described in more detail hereinafter.

The optical disc player comprises two automatic control systems, namely one for focussing control and one for tracking. The focussing control serves for keeping the read spot 23 automatically focussed on the recording surface and for automatically eliminating possible deviations. The tracking control, which comprises a slow and a fast tracking component, serves for automatically correcting positional deviations of the read spot relative to the recording tracks on the recording surface. Since the construction and operation of the control systems are irrelevant to the invention, these systems are not described any further.

The pivotal-arm device 15 comprises a deckplate 3A of the said chassis 3 and a plastics pivotal arm 25 which is pivotal about a pivotal axis 27. The pivotal arm 25 comprises a frame 101 of said device 13, which frame is moulded on a first end, the objective 19 extending through an opening 3B in the deck plate 3A. On its second end the pivotal arm 25 carries a counter-mass 29. A pivotal-arm bearing arrangement for supporting the pivotal arm 25 so as to be pivotable about the pivotal axis 27, comprises two bearings, one on each side of the pivotal arm 25. Each of the bearings comprises two bearing sections 31 and 33, a ball 32 arranged between them, and a viscous medium. The two bearing sections 31 are formed during injection-moulding of the plastics pivotal arm 25 and are therefore integral with the pivotal arm. One of the bearing sections 33 is integrated in the deck plate 3A of the chassis 3 and the other bearing section 33 is arranged in a plastics support 37 which is secured to a leaf spring 39. In the present embodiment the deck plate 3A of the chassis 3 is injection-moulded from a plastics and the plastics support 37 is moulded on the metal leaf spring 39. The leaf spring 39 is secured to the deck plate 3A by means of two screws 41 and bears on two upright portions 43 of the chassis 3 under axial pretension, to preclude axial play in the bearings.

For the radial movement of the read spot 23 over the recording surface 8 of the optical disc 7 two coils 45 and 47 and two permanent magnets 49 and 51 are provided. The magnets 49 and 51 cooperate with the coils 45 and 47 via an air gap. The coils are so wound and the magnets are so magnetized that each coil exerts an electromagnetic pivotal force in the plane perpendicular to the pivotal axis 27. The coils 45 and 47 are substantially rectangular and are arranged in through-holes 53 and 55 in the pivotal arm 25. The axially magnetized magnets 49 and 51 are shaped as circular segments and extend throughthe holes 53 and 55 in the pivotal arm 25. The magnets 49 and 51 are non-rotatably secured to the chassis 3. For this purpose the magnets 49 and 51 are glued to iron yokes 49A and 51A respectively, which are shaped as circular segments. Identical yoke portions 49B and 51B, which are also shaped as circular segments, traverse the coils 45 and 47. The yoke portions 49A, 51A, 49B and 51B are secured to the deck plate.

Figure 4:
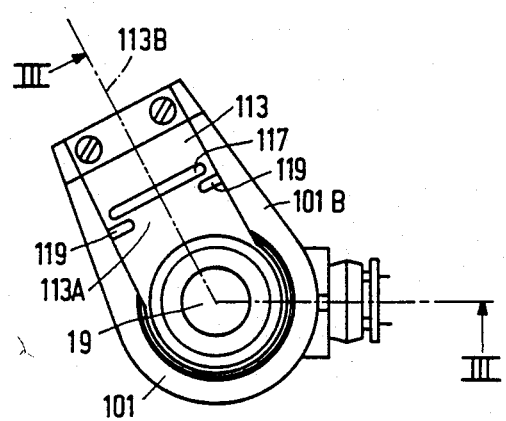
FIG. 4 is a plan view of the device of FIG. 3.
Figure 5:
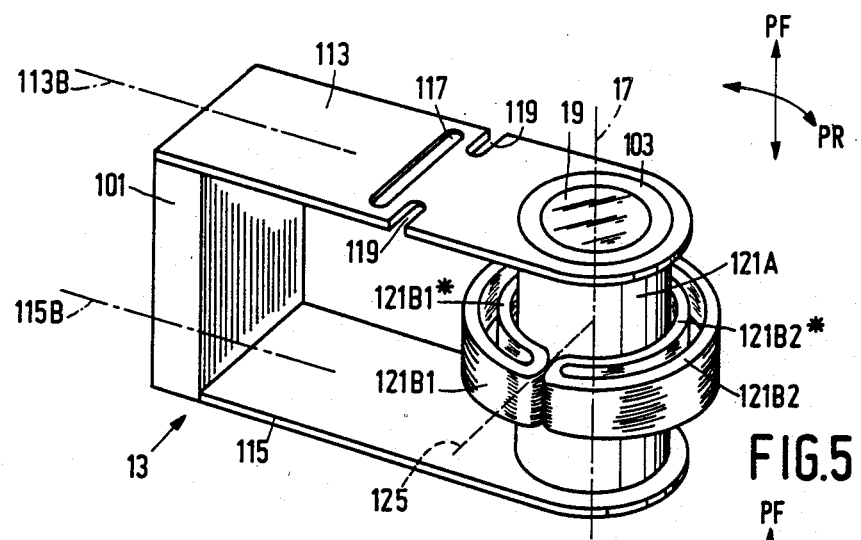
FIG. 5 is a diagrammatic perspective view of the device shown in FIG. 3.

The device in accordance with the invention as shown in FIGS. 3, 4 and 5 serves for reading the optical disc 7 and is employed in the optical disc player as shown in Figures1 and 2. The device comprises the said frame 101, which in the present embodiment also comprises a tube 101A carrying a unit 101B. A movable objective holder 103 comprising the objective 19 is arranged on the frame 101. The unit 101B comprises two stationary lenses 105 and 107 and two splitter prisms 109A and 109B. A semiconductor laser 111 emits the laser beam 21 which is focussed by the objective 19 to form the light spot 23 on a recording track on the disc 7. The radiation beam which is reflected from the reflecting layer of the optical disc and which is modulated by the information on this disc is reflected to a semiconductor-diode system 112 as a beam 21A by a reflecting surface between the splitter prisms 109A and 109B.

The objective holder 103 is movably connected to the frame 101 by means of two flexible supporting means which are long relative to their thickness and which take the form of two leaf springs 113 and 115. One of the leaf springs, namely the upper leaf spring 113, has a narrow cut-out 117 which extends transversely of the leaf spring and two notches 119 which are spaced at short distance from said cut-out. The presence of the cut-out 117 and the notches 119 makes the central portion of the leaf spring 113 more compliant, so that the spring is elastically deformable, specifically extensible, over a limited distance in its longitudinal direction 113B.

For the cntrolled movement of the objective an electromagnetic actuator is provided, comprising first actuator means in the form of an annular magnet 121A secured to the objective holder 103, and second actuator means in the form of two segmental coils 121B1 and 121B2 secured to the frame 101, said actuator means cooperating with one another via an air gap 123. The annular permanent magnet 121A is axially magnetized in such a way that zones of south polarity S are formed on the upper and the lower side of the magnet and a zone of north polarity N is formed in the central portion of the magnet. The segmental coils 121B1 and 121B2 are arranged coaxially around the annular magnet 121A in such a way that said air gap 123 is formed. The segmental coils 121B1 and 121B2 are banana-shaped and comprise active coil portions 121B1* and 121B2* respectively, extending circumferentially of the magnet.

When the coils 121B1 and 121B2 are driven selectively the above construction of the device 13 in accordance with the invention enables the objective 19 to be moved both in the focussing direction, indicated by the double arrow PF in FIG. 5, and in the radial direction, indicated by the double arrow PR in FIG. 5. In the case of a displacement in the radial direction the objective 19 is tilted about a pivotal axis 125 which is disposed in the same plane as the leaf spring 115 and which is oriented transversely of the longitudinal direct on 115B of this spring, causing said spring to be deformed elastically, i.e. to longthen or shorten temporarily. Said pivotal movements of the objective 19 need only be small and in conjunction with the pivotal arm 25 of the optical disc player they provide radial tracking, the pivotal movements of the objective 19 about the pivotal axis 125 specifically enabling high-frequency deviations in the position of the recording track to be followed by the read spot 23.

Figure 6A:
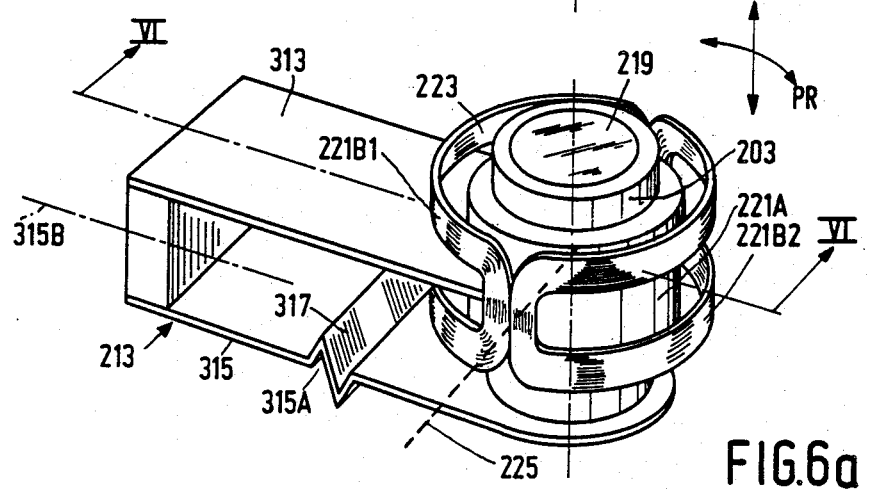
FIG. 6A is a diagrammatic perspective view of a modification of the device in accordance with the invention shown in FIG. 3.
Figure 6B:
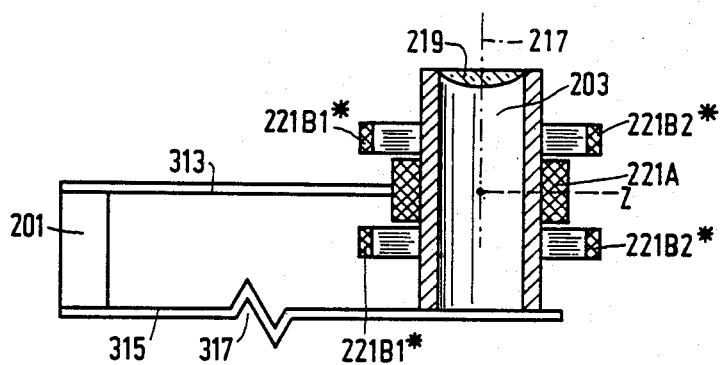
FIG. 6B is a sectional view taken on the lines VI—VI in FIG. 6A.

FIGS. 6A and 6B show a modification of the device in accordance with the invention described in the foregoing. This modification, hereinafter referred to as the device 213, comprises a frame 201, an objective holder 203 with an objective 219 having an optical axis 217, two leaf springs 313 and 315 which are arranged one above the other and which are secured to the frame 201 and to the holder 203, and an electromagnetic actuator. In a central portion 315A the leaf spring 315 exhibits a double fold 317 which extends transversely of the longitudinal direction 315B of the leaf spring. Said actuator comprises first actuator means in the form of an axially magnetized cylindrical permanent magnet 221A, and second actuator means in the form of two segmental coils 221B1 and 221B2, which are arranged adjacent one another viewed in the circumferential direction of the magnet 221A. Between the magnet 221A secured to the objective holder 203 and the segmental coils secured to the frame 201 and coaxially surrounding said magnet an air gap 223 is formed. The segmental coils each comprise two active coil portions 221B1* and 221B2* adjoining the air gap 223. In the present example the mass centre Z of the assembly comprising the objective holder 203, the objective 219 and the magnet 221A is situated in the same plane as the leaf spring 313.

When the segmental coils 221B1 and 221B2 are driven selectively, displacements of the objective in the focussing direction indicated by the arrow PF and/or in the radial direction indicated by the arrow PR are possible. In the case of a displacement in the direction indicated by the arrow PR the objective is tilted about the piotal axis 225 through the mass centre Z.

Obviously the invention is not limited to the embodiments described herein.

What is claimed is:

1. A device for directing a radiation beam towards a recording surface of a rotating disc for recording and/or scanning a recording track without mechanical contact, comprising
    a frame,
    an objective holder comprising an objective with an optical axis,
    two elongate leaf springs which are arranged one above the other viewed along the optical axis of the objective and which have their ends secured to the frame and to the objective holder, to allow movements of the objective along the optical axis, and
    an electromagnetic acturator comprising first actuator means secured to the objective holder and second actuator means secured to the frame, which means cooperate electromagnetically with one another via an air gap for the controlled movement of the objective, characterized in that
    at least one of the leaf springs is elastically extensible in its longitudinal direction to allow pivotal movements of the objective about a pivotal axis which is oriented transversely of a plane containing the optical axis and intersecting the leaf springs, and
    the actuator is adapted to provide the driving force for said pivotal movements.

2. A device as claimed in claim 1, characterized in that the elastically extensible leaf spring is rendered more compliant in a central area intermediate its two ends by openings which extend substantially transversely of the longitudinal direction of the leaf spring.

3. A device as claimed in claim 1, characterized in that the elastically extensible leaf spring is rendered more compliant in a central area intermediate its two ends by at least one fold which extends substantially transversely of the longitudinal direction of the leaf spring.

4. A device as claimed in claim 1, characterized in that the elastically extensible leaf spring comprises a leaf-spring portion which is made of rubber or plastic.

5. A device as claimed in claim 1, in which the first actuator means comprise an axially magnetized cylindrical magnet body, characterized in that the second actuator means comprise at least two bananashaped segmental coils which are arranged adjacent one another viewed in a circumferential direction of the magnet body, which coils each comprise an active coil portion which adjoins the air gap and which extends circumferentially of the magnet body and a coil portion which is more remote from the air gap.

6. A device as claimed in claim 5, characterized in that the elastically extensible leaf spring is situated closer to the objective than the other leaf spring.

7. A device as claimed in claim 1, in which the first actuator means comprise an axially magnetized cylindrical magnet body, characterized in that the second actuator means comprise at least two segmental coils which are arranged adjacent each other circumferentially of the magnet body and each comprise two active coil portions adjoining the air gap and extending circumferentially of the magnet body.

8. A device as claimed in claim 7, characterized in that the mass centre of the assembly comprising the objective holder with the objective and the first actuator means is disposed at least substantially in the same plane as one of the leaf springs, the other leaf spring being the elastically extensible leaf spring.

9. An optical disc player comprising a turntable having a supporting surface for the rotary drive of an optical disc, and comprising a device as claimed in claim 1, the frame of the device being movable in a direction parallel to the supporting surface of the turntable.

10. An optical disc player is claimed in claim 9, characterized in that the frame of the device forms part of a pivotal-arm device of the disc player.

* * * * *